(12) United States Patent
Oka

(10) Patent No.: US 9,982,704 B2
(45) Date of Patent: May 29, 2018

(54) FASTENING DEVICE

(71) Applicant: Kazutomi Oka, Hiratsuka (JP)

(72) Inventor: Kazutomi Oka, Hiratsuka (JP)

( * ) Notice: Subject to any disclaimer, the term of this patent is extended or adjusted under 35 U.S.C. 154(b) by 84 days.

(21) Appl. No.: 15/191,153

(22) Filed: Jun. 23, 2016

(65) Prior Publication Data

US 2016/0377109 A1 Dec. 29, 2016

(30) Foreign Application Priority Data

Jun. 23, 2015 (JP) ................................. 2015-126068

(51) Int. Cl.
*F16B 43/02* (2006.01)
*F16B 39/24* (2006.01)
*F16B 5/02* (2006.01)

(52) U.S. Cl.
CPC ............ *F16B 39/24* (2013.01); *F16B 5/0225* (2013.01); *F16B 43/02* (2013.01)

(58) Field of Classification Search
CPC ...... F16B 5/025; F16B 5/0225; F16B 5/0233; F16B 39/24; F16B 43/00; F16B 43/007; F16B 43/02
USPC .............. 411/368, 371.2, 380, 537, 538, 539
See application file for complete search history.

(56) References Cited

U.S. PATENT DOCUMENTS

| | | | | |
|---|---|---|---|---|
| 1,352,918 A | * | 9/1920 | Rohbock | F16B 39/24 24/569 |
| 3,220,289 A | * | 11/1965 | Farekas | B23Q 1/70 411/288 |
| 3,422,721 A | * | 1/1969 | Yonkers | F16B 43/001 277/637 |
| 4,362,449 A | * | 12/1982 | Hlinsky | B60B 3/145 411/156 |
| 4,406,474 A | * | 9/1983 | Scharf | B62D 25/168 280/154 |
| 4,717,299 A | * | 1/1988 | Underwood | F16B 39/26 411/11 |
| 4,854,798 A | * | 8/1989 | Snyder | F16B 31/043 254/29 A |
| 5,263,997 A | * | 11/1993 | Parker | F01D 25/243 403/30 |

(Continued)

FOREIGN PATENT DOCUMENTS

| | | |
|---|---|---|
| JP | 10-318240 A | 12/1998 |
| JP | 2002-295440 A | 10/2002 |

(Continued)

*Primary Examiner* — Roberta S Delisle
(74) *Attorney, Agent, or Firm* — Westerman, Hattori, Daniels & Adrian, LLP

(57) ABSTRACT

Internally threaded device 10 includes a main body 11 having an internal thread portion 13 and a ring-like seat portion 12 disposed between the main body 11 and a member to be fastened 30. The main body 11 has a convex portion 15 and the ring-like seat portion 12 has a concave portion 16, the convex portion 15 and the concave portion 16 have a spherical zone with a center on an axis line. The radius of the spherical shape is set to allow the convex portion 15 and the concave portion 16 to slide earlier than the internal thread portion 13 when a load is applied between the main part 11 and the member 30 in a direction crossing the axial line L. Externally threaded device 40 and washer device 50 in similar structures prevent loosening of the engaged portion easily.

6 Claims, 8 Drawing Sheets

(56) References Cited

U.S. PATENT DOCUMENTS

| | | | | |
|---|---|---|---|---|
| 5,451,116 A * | 9/1995 | Czachor | ............... | F01D 9/065 403/28 |
| 5,743,496 A * | 4/1998 | Atkinson, Jr. | ............ | E01B 7/10 246/463 |
| 7,056,053 B2 * | 6/2006 | Schilling | ............... | F16B 43/02 285/12 |
| 2013/0259600 A1 * | 10/2013 | Kerechanin, II | ........ | F16B 43/02 411/368 |

FOREIGN PATENT DOCUMENTS

| JP | 2004-340211 A | 12/2004 |
|---|---|---|
| JP | 1516795 S | 2/2015 |
| JP | 1516796 S | 2/2015 |
| JP | 1518312 S | 3/2015 |
| JP | 1518688 S | 3/2015 |
| JP | 1520238 S | 3/2015 |
| JP | 1520239 S | 3/2015 |
| JP | 1520240 S | 3/2015 |
| JP | 1520241 S | 3/2015 |
| JP | 1522912 S | 5/2015 |

* cited by examiner

FASTENING DEVICE

This application claims the benefit of Japanese Application No. 2015-126068 filed in Japan on 23 Jun. 2015, which is herein incorporated by reference in its entirety.

BACKGROUND OF THE INVENTION

Field of the Invention

This invention relates to a fastening device, such as internally threaded device, externally threaded device, and Washer device

Description of the Related Art

Threaded devices such as bolts, machine screws, and nuts have conventionally been used to fasten various members. Because of their moderate price and ease of attachment/detachment, threaded devices are widely used for structures and mechanical appliances. However, it is also known that threaded devices get loose while being used. Accidents resulting from loosening have never ceased, and even emerge as major social problems depending on circumstances.

Causes of loosening include those not involving the rotation of engaged portion such as deformation and yield of internally and externally threaded devices and those resulting from the rotation of engaged portion due to repetitive reciprocal rotation of a shaft, repetitive reciprocal movement in a direction orthogonal to the shaft, increase or decrease in loads in the axial direction, and inertial torque. Loosening due to external force repetitively applied in a direction orthogonal to the axial direction is acknowledged as a major problem because the looseness cannot be assessed easily due to slow progress.

Many products such as threaded devices free from loosening and members for preventing threads from becoming loose are commercially available. Some of these products have high reliability proven by the results of vibration tests.

SUMMARY OF THE INVENTION

However, in light, of the mechanism of loosening of threads that has recently been known, reliability needs to be improved further. A purpose of the present invention is to provide a fastening device, such as internally threaded device, externally threaded device, and washer device that do not allow engaged portion to get loose easily.

Based on the mechanism of loosening of threads, causes of loosening are assessed as follows. As shown in FIG. 6, when two or more members 30 are fastened by screwing a hexagon head bolt 20, which is external thread device, into a nut 25, which is internal thread device, by sufficient torque, axial force F is applied to the members 30 from the bearing surface of the head 22 of the hexagon head bolt 20 and the bearing surface of the nut 25. If horizontal force P exceeding the fastening force generated as axial force F is applied in this state to the member 30 in a direction orthogonal to the axial line L, displacement is caused between one member to be fastened 30 and another member to be fastened 30. As a result, as shown in FIG. 7, the nut 25 starts translation movement with respect to the hexagon head bolt 20 in a direction orthogonal to the axial line L, following the movement of the member to be fastened 30.

Then, as shown in FIG. 8, on the front side with respect to the direction of load applied to the portion where the thread of the external thread portion 23 of the hexagon head bolt 20 and the thread of the internal thread portion 13 of the nut 25 are engaged, which is shown by the right. figure in FIG. 8, normal component of reaction from the thread surface decreases, whereas the force in a sliding direction along the thread surface increases. In other words, the drag from the thread surface is expressed as $F \cdot \tan(\rho - \alpha')$, where F is axial force, $\alpha'$ is half of the angle of thread, the value obtained by taking a lead angle into consideration, and $\rho$ is angle of friction. Meanwhile, on the rear side with respect to the loading direction, which is shown by the left figure in FIG. 8, the drag from the thread surface as well as the force climbing along the thread surface increases. In other words, the drag from the thread surface is expressed as $F \cdot \tan(\rho + \alpha')$, where F is axial force, $\alpha'$ is half of the angle of thread, the value obtained by taking a lead angle into consideration, and $\rho$ is angle of friction. That is to say, rotation moment and reverse rotation moment of the hexagon head bolt 20 and the nut 25 increase, thereby moving the screw devices in a direction orthogonal to the axial direction.

Furthermore, because of lead, on the left side with respect to the loading direction, which is shown by the top figure in FIG. 8, since the thread of the internal thread portion 13 of the nut 25 is inserted into the thread of the external thread portion 23 of the hexagon head bolt 20, a force likened as driving a wedge increases. In other words, the drag from the thread surface is expressed as $F \cdot \tan(\rho' - \beta)$, where F is axial force, $\rho'$ is the value of friction angle, taking the lead angle into consideration, and $\rho$ is lead angle. Meanwhile, on the right side with respect to the loading direction, which is shown by the bottom figure in FIG. 8, a force likened as removing a wedge increases. In other words, the drag from the thread surface is expressed as $F \cdot \tan(\rho' - \beta)$, where F is axial force, $\rho'$ is the value of friction angle, taking lead angle into consideration, and $\beta$ is lead angle. That is to say, turning force around the axis, namely the force in a twisting direction, of the hexagon head bolt 20 increases.

As a result of these occurring at the same time, the thread surface slides against the friction force at the portion where the thread of the external thread portion 23 and the thread of the internal thread portion 13 of the nut 25 are engaged, and the engaged portion displaces in a loosening direction, resulting in loosening of the threads. In this case, even if the applied external force is not large enough to cause full sliding of each bearing surface of the head 22 of the hexagon head bolt 20 and the nut 25, which is defined as local sliding of the bearing surfaces with fastened portion being maintained at all times, sliding of the thread surface and displacement in the loosening direction are repeated in different directions due to the external force, allowing loosening of threads to progress little by little. Decrease in the fastening force and rapid loosening of the threads result eventually, causing full sliding of bearing surfaces.

On the basic of the causes of loosening of threads, it is apparent that the larger the inclination of the thread, the larger the decrease in friction force, hence the thread surface becoming more slippery. Also it is not hard to anticipate that no force would be applied in the twisting direction if there were no lead.

The present inventor focused attention on those points and found that loosening of threads can be prevented by providing the seat of various threaded devices with a portion that slides earlier than the engaged portion, thereby inhibiting force in a twisting direction from being generated to the threaded parts.

Accordingly the present invention is directed to a fastening device, such as internally threaded device, externally threaded device, and washer device that substantially obviates one or more of the problem due to limitations and disadvantages of the related art.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a fastening device including a main body having a thread portion; and a ring-like seat portion disposed between the main body and a member to be fastened, wherein the main body has a convex portion and the ring-like seat portion has a concave portion, or the main body has a concave portion and the ring-like seat portion has a convex portion, the convex portion is slidably fitted in the concave portion, the convex portion and the concave portion have a spherical zone with a center on an axis line, the spherical zone has a radius shorter than a distance between the axis line and a flank of the thread portion and along a normal line of the flank, and the spherical zone has a larger angle of inclination than a flank angle.

In another aspect, the invention provides a washer device including a first ring-like seat portion and a second ring-like seat portion, held between a member to be fastened and an internally threaded device having the internal thread portion, or a head portion of an externally threaded device when a shaft portion of the externally threaded device is penetrated into the member, wherein, the first ring-like seat portion has a convex portion and the second ring-like seat portion has a concave portion, or the first ring-like seat portion has a concave portion and the second ring-like seat portion has a convex portion, the convex portion is slidably fitted in the concave portion, the convex portion and the concave portion have a spherical zone with a center on an axis line, the spherical zone has a radius shorter than a distance between a flank of the internal thread portion and the axis and along a normal line of the flank, and the spherical zone has a larger angle of inclination than a flank angle.

DETAILED DESCRIPTION OF THE PREFERRED EMBODIMENTS

Embodiments of the present invention will be described with reference to the appended drawings.

First Embodiment

Figure 1:
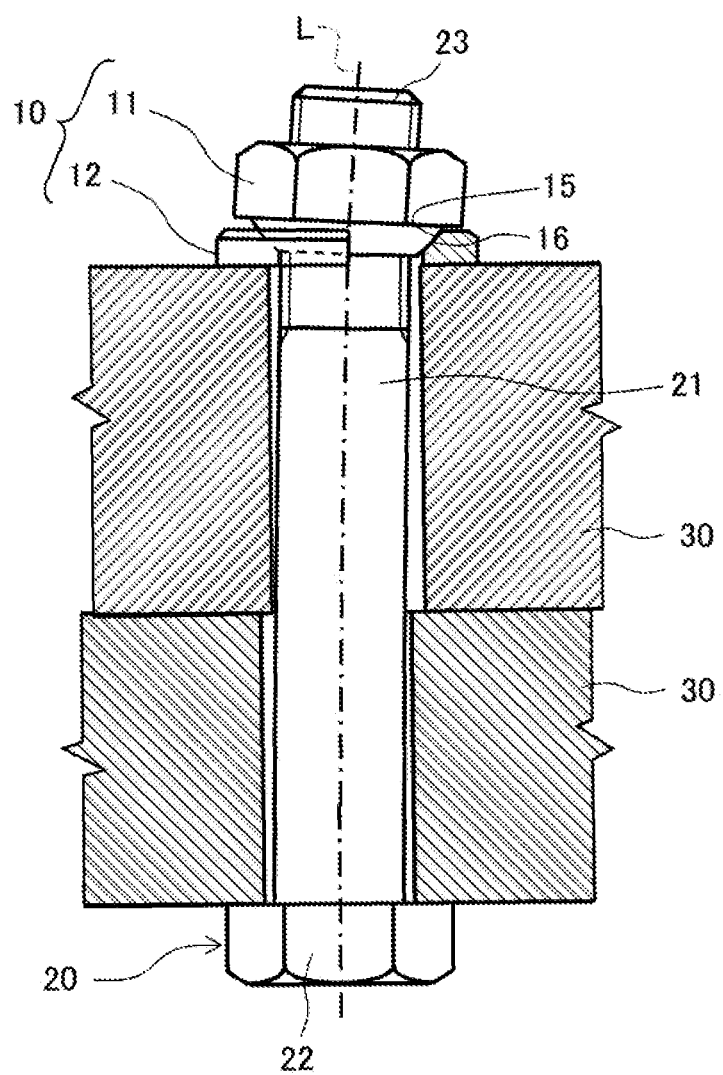
FIG. 1 is a cross-sectional view showing a state where a plurality of members to be fastened are fastened by using a fastening device according to a first embodiment of the present invention.

FIG. 1 is a cross-sectional view showing a state where a plurality of members to be fastened are fastened by using a fastening device according to first embodiment of the present invention. In a first embodiment, as shown in FIG. 1, internally threaded device 10 and a hexagon head bolt 20 are used to fasten a plurality of members to be fastened 30, 30. The shaft portion 21 of the hexagon head bolt 20 is disposed, penetrating into holes 31, 31 of the members to be fastened 30, 30. In a state where the bearing surface on a side of the head 22 abuts against, the surface of one member to be fastened 30, the external thread portion 23 protrudes from the other member to be fastened 30 on the end of the shaft portion 21. The internally threaded device 10 in a first embodiment is mounted to the external thread portion 23 of the hexagon head bolt 20. The external thread portion 23 is a triangular screw thread.

The internally threaded device 10 in the first embodiment includes a main internal thread body 11 and a ring-like internal thread seat portion 12. The main internal thread body 11 includes an internal thread portion 13, which is a triangular thread. The internal thread seat portion 12 is disposed between the member to be fastened 30 and the main internal thread body 11. The main internal thread body 11 is in a hexagonal shape in a planar view, and has the internal thread portion 13 penetrating along the axial line L. The internal thread seat portion 12 has a ring shape larger than the main internal thread body 11 in a planar view, has an opening 12a through which the shaft portion 21 of the external thread portion 23 and the external thread portion 23 can pass, and one face of the internal thread seat portion 12 can abut against the surface of a member to be fastened 30.

Figure 2:
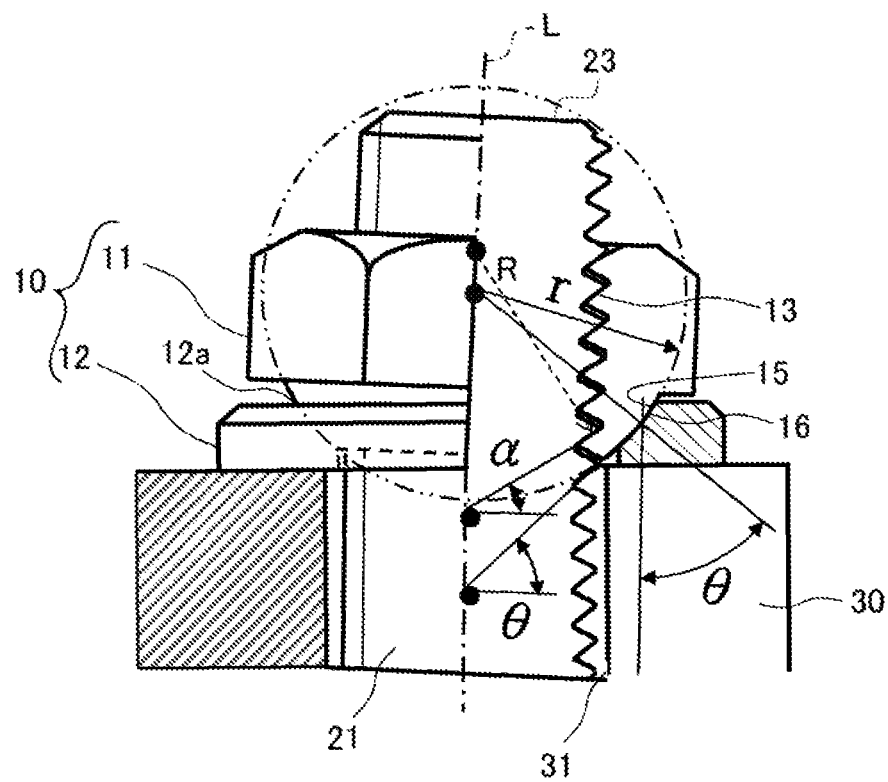
FIG. 2 is a magnified cross-sectional view of the fastening device according to the first embodiment of the present invention.

The main internal thread body 11 which is called a main body has a convex portion 15. The internal thread seat portion 12 which is called a ring-like seat portion has a concave portion 16. The convex portion 15 is slidably fitted in the concave portion 16. In other word, at a position where the main internal thread body 11 and the internal thread seat portion 12 abut against each other, the convex portion 15 and the concave portion 16, which are fitted and allowed to slide, are provided. As shown in FIG. 2, the convex portion 15 and the concave portion 16 have spherical zone with a center on an axis line L. It is desirable that the center of the spherical zone of the convex portion 15 and the center of the spherical zone of the concave portion 16 be matched in a state where the convex portion 15 is fitted into the concave portion 16. The spherical zone of the convex portion 15 and that of the concave zone 16 may be identical, but the convex portion 15 may be formed larger or smaller than the concave portion 16.

The spherical zone of the convex portion 15 and that of the concave portion 16 allow the convex portion 15 abutted against the concave portion 16 to slide around the axial line L, and in a rocking direction along the axial line L. The circumferential end of the convex portion 15 and that of the concave portion 16 are apart from each other. The radius of the spherical zone of the convex portion 15 and that of the concave portion 16 are set so that the convex portion 15 and the concave portion 16 slide earlier than the thread of the external thread portion 23 and the thread of the internal thread portion 13 start to slide, when a load is applied between the main internal thread body 11 and the member to be fastened 30 in a direction crossing the axial line L in a state where the internally threaded device 10 are engaged with the external thread portion 23.

For example, the radius r of the spherical zone of the convex portion 15 and that of the concave portion 16 are set to be shorter than the distance R between the flank of the internal thread portion 13 and the axial line L, namely the minimum distance R along the direction of the normal line of the flank. Also the minimum angle of inclination θ of the tangent of the spherical zone, namely the minimum angle of inclination θ formed by a virtual line crossing orthogonal to the axial line L and the tangent of the spherical zone, is set to be larger than the flank angle α. In other words, it is preferable that the radius r of the spherical zone is the same as or shorter than R, and the minimum angle of inclination formed by the normal line of the spherical zone and the axial line L is 30° or larger and the maximum angle of inclination falls within a range from 50° to 70°.

It is more preferable that, assuming the torque found by multiplying frictional force generated between the convex portion 15 and concave portion 16 by the radius r to be T1, and the sliding torque found by multiplying the frictional force generated at the flank of the internal thread portion 13 and that of the external thread portion 23 by the radius H to be T2, the slip factor η expressed as T1/T2 is smaller than 1, and that the slip factor η is determined depending on the situation of the load to be applied and the degree of importance of fastening.

When the coefficient of friction between the concave portion 16 and the convex portion 15 is the same as the coefficient of friction between the threads, the slip factor η may be found by $(r \cdot \cos θ)/(R \cdot \cos α)$, where r, θ, and α represent the same items described previously.

In the first embodiment of the present invention, the convex portion 15 and the concave portion 16 are in a spherical zone centered at a point on the axial line L, and are set to slide earlier than the engaged portion when a load is applied in a direction crossing the axial line L. When the members 30, 30 are fastened by engaging the internally threaded device 10 with the external thread portion 23, due to the sliding of the convex portion 15 and the concave portion 16, a load exceeding the static frictional force is not applied to the portion where the external thread portion 23 and the internal thread portion 13 are engaged even if a load is applied repetitively during use in a direction crossing the axial line L. Relative turning of the engaged portion can thus be prevented, hence loosening of the engaged portion can be prevented easily.

Figure 3:
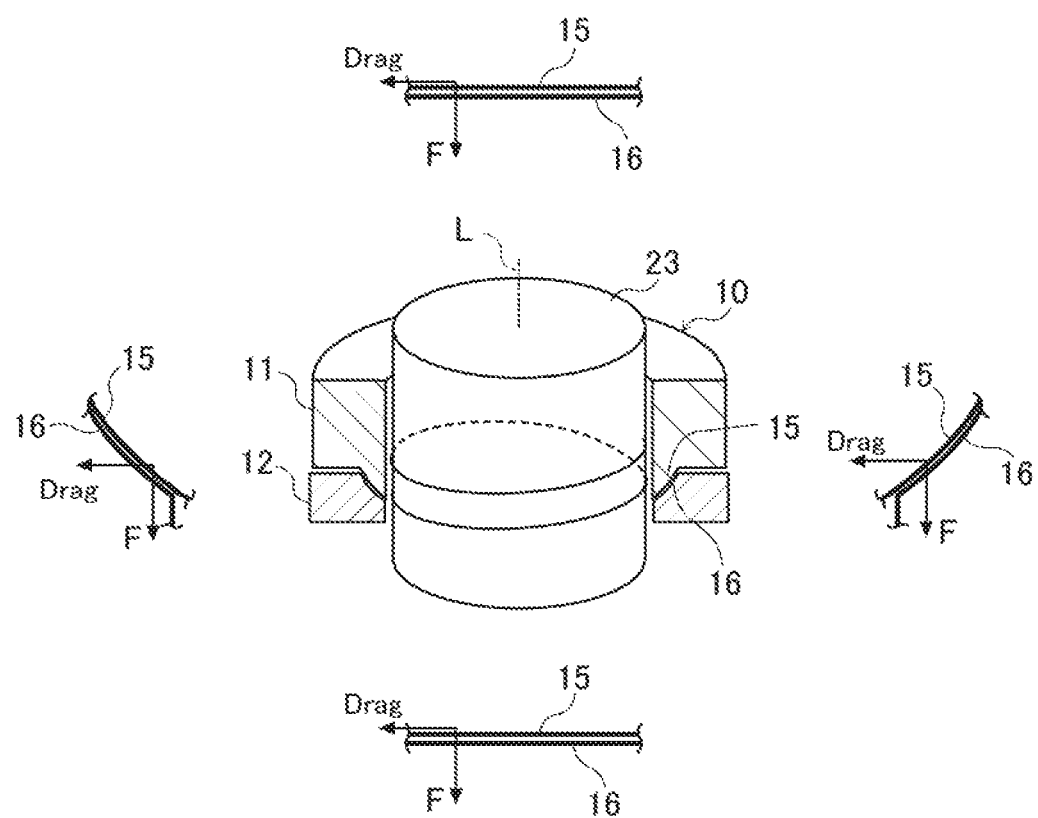
FIG. 3 is a view schematically showing static frictional force applied to concave portion and convex portion of the fastening device according to the first embodiment of the present invention.

In other words, as shown in FIGS. 2 and 3, since the minimum angle of inclination θ of the tangent of the spherical zone is larger than the flank angle α, the angle of inclination at the portion where the convex portion 15 abuts against the concave portion 16 not becomes smaller than the flank angle α. As a result, the convex portion 15 and the concave portion 16 are more likely to slip than the threads of the external thread portion 23 and the threads of the internal thread portion 13.

Figure 8:
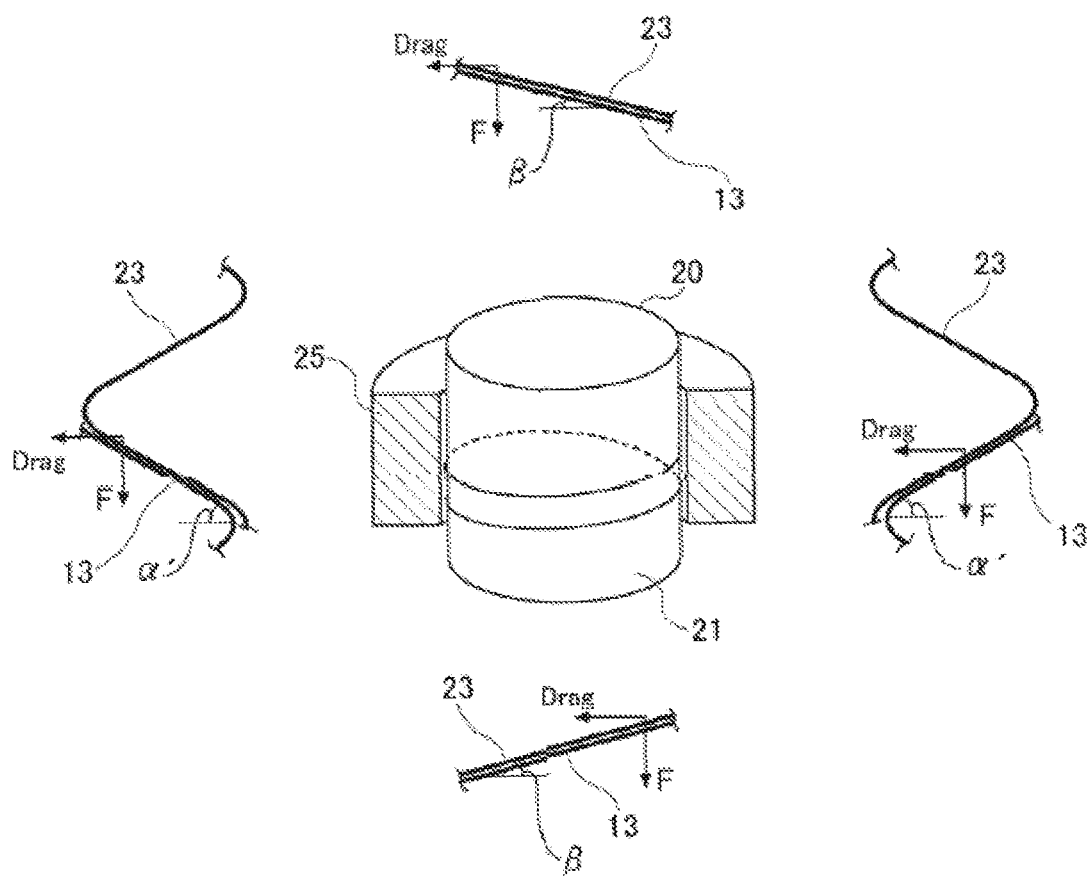
FIG. 8 is a view schematically showing static frictional force applied to a screw portion of the conventional fastening device.

As shown in FIG. 3, on the front side with respect to the loading direction at the part where the thread of the external thread portion 23 and the thread of the internal thread portion 13 are engaged, which shown by the right figure in FIG. 8, the drag from the thread surface is expressed as $F \cdot \tan(ρ-θ)$, where F is axial force, ρ is friction angle, and θ is the angle of inclination of the spherical zone, namely the angle of inclination of the spherical seat. Meanwhile, on the rear side with respect to the loading direction, which is shown by the left figure in FIG. 3, the drag from the thread surface is expressed as $F \cdot \tan(ρ+θ)$, where ρ is friction angle and θ is the angle of inclination of the spherical zone, namely the angle of inclination of the spherical seat portion.

Furthermore, unlike the thread of the external thread portion 23 and the thread of the internal thread portion 13, no lead exists between the convex portion 15 and the concave portion 16. On both the left side, which is shown by the top figure in FIG. 3, and the right side, which is shown by the bottom figure in FIG. 3, with respect to the loading direction, the drag from the thread surface is expressed as $μF/\cos θ$, where F is axial force, μ is coefficient of friction, and θ is the angle of inclination of the spherical zone, namely the angle of inclination of the spherical seat portion.

When a plurality of members to be fastened 30, 30 are fastened by attaching the internally threaded device 10 to the external thread portion 23 of the hexagon head bolt 20 and engaging the main internal thread body 11 by sufficient torque, axial force F is applied between the external thread portion 23 and the internal thread portion 13 of the main internal thread body 11, and between the convex portion 15 of the main internal thread body 11 and the concave portion 16 of the internal thread seat portion 12. If horizontal force P in a direction crossing the axial line L is applied from the members to be fastened 30, 30, the convex portion 15 of the main internal thread body 11 and the concave portion 16 of the internal thread seat portion 12 slide, as described previously, being unable to resist the frictional force between the convex portion 15 of the main internal thread body 11 and the concave portion 16 of the internal thread seat portion 12.

At that time, at the portion where the external thread portion 23 and the internal thread portion 13 are engaged, the convex portion 15 of the main internal thread body 11 and the concave portion 16 of the internal thread seat portion 12 slide, and as a result, the effect of the horizontal force P in a direction crossing the axial line L is suppressed. Due to the inclination of the hexagon head bolt 20, unbalanced load, namely reverse rotation moment, is generated, and the translating bearing surface of the internal thread seat portion 12 bears the unbalanced load. However, since the convex portion 15 of the main internal thread body 11 and the concave portion 16 of the internal thread seat portion 12 slide earlier, the unbalanced load is transformed into a uniform load in the axial direction. Focusing of stress on the screw portion, which results in fatigue breakdown and delayed fracture of bolts, can thus be prevented together with the relative sliding of the engaged portion.

Since no lead angle exists between the convex portion 15 and the concave portion 16, turning force, namely twist, which causes loosening of the engagement between the external thread portion 23 and the internal thread portion 13, is not generated between the hexagon head bolt 20 and the internally threaded device 10 even if the convex portion 15 and the concave portion 16 slide. In this way, due to an operation of the function of concave portion 15 and convex portion 16 which are spherical, both sliding of screw surface and twisting of the screw shaft, the two major causes of loosening of screws, can be prevented. Loosening of the engagement of the external thread portion 23 of the hexagon head bolt 20 and the internal thread portion 13 of the internally threaded device 10 can thus be prevented.

In the first embodiment, a case where the internally threaded device 10 is engaged with the hexagon head bolt 20 was described. However, the internally threaded device 10 in this embodiment may be engaged with a machine screw, screw stock, etc., instead of the hexagon head bolt 20. The concave portion 16 may be formed in a part or the whole of the opening 12a of the internal thread seat 12.

In the first embodiment, a case where the main internal thread body 11, which is called a main body, has a convex portion 15 and where the internal thread seat portion 12, which is called a ring-like seat portion, has a concave portion 16 is described. However a case where the main internal thread body 11, which is called a main body, has a concave portion and where the internal thread seat portion 12, which is called a ring-like seat portion, has a convex portion 15 is applied.

Second Embodiment

Figure 4:
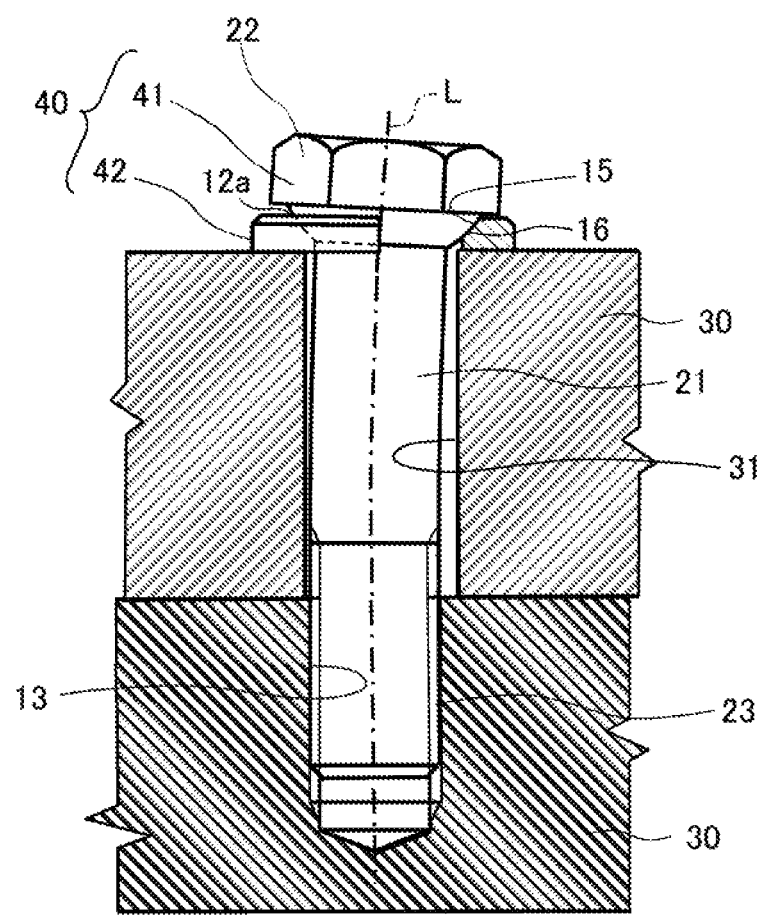
FIG. 4 is a cross-sectional view showing a state where members to be fastened are fastened by using a fastening device according to a second embodiment of the present invention.

FIG. 4 is a cross-sectional view showing a state where members to be fastened are fastened by using externally threaded device according to a second embodiment of the present invention. In the second embodiment, as shown in FIG. 4, a plurality of members to be fastened 30, 30 are fastened by using externally threaded device 40. In this case, the externally threaded device 40 is disposed, penetrating into the hole 31 of one members to be fastened 30 and being engaged with an internal thread portion 13 provided on the other member to be fastened 30. The external thread portion 23 and the internal thread portion 13 are triangular screw threads.

The externally threaded device 40 includes a main external thread body 41 and a ring-like external thread seat portion 42. The main external thread body 41 has a shaft portion 21, which is provided with an external thread portion 23, and a head portion 22. The external thread seat portion 42 is disposed between the head portion 22 and the member to be fastened 30. The head portion 22 is in a hexagonal shape in a planar view, and the shaft portion 21 and the external thread portion 23 are provided along the axial line L. The external thread seat portion 42 has a circular shape larger than the head portion 22 in a planar view, and has an opening 12a through which the shaft portion 21 can pass along the axial line L. One face of the external thread seat portion 42 can abut against the surface of one member to be fastened 30.

The head portion 22 has a convex portion 15 and the ring-like seat portion 42 has a concave portion 16. The convex portion 15 is slidably fitted in the concave portion 16. The convex portion 15 and the concave portion 16 have a spherical zone with a center on an axis line L. In other words, at a position where the head portion 22 abuts against the external thread seat portion 42, a convex portion 15 and a concave portion 16, which are engaged and capable of sliding, are provided. The convex portion 15 of the main external thread body 41 and the concave portion 16 of the external thread seat portion 42 are formed in a spherical zone similar to the first embodiment.

In the second embodiment of the present invention, the convex portion 15 of the main external thread body 41 and the concave portion 16 of the external thread seat portion 42 have a similar shape as the first embodiment, namely a spherical zone centered at a point on the axial line L, and the convex portion 15 and the concave portion 16 are set to slide earlier than the engaged portion when a load is applied in a direction crossing the axial line L. As a result, by engaging the externally threaded device 40 with the internal thread portion 13 to fasten the plurality of members to be fastened 30, 30, functional effect similar to the first embodiment can be acquired, and loosening of the engaged portion can thus be prevented easily.

In the second embodiment, a case where a bolt is used as the externally threaded device 40 was described. However, the externally threaded device is not limited to bolts. Various machine screws having a head portion 22 in various shapes can also be used. It is also possible to engage internally threaded device 10 in the first embodiment with externally threaded device 40 in the second embodiment to support and fasten the members to be fastened 30, 30 between the head portion 22 of the externally threaded device 40 in the second embodiment and the internally threaded device 10 in the first embodiment.

In the second embodiment, a case where the head portion 22 has a convex portion 15 and where the ring-like seat portion 42 has a concave portion 16 is described. However a case where the head portion has a concave portion and where the ring-like seat portion has a convex portion is applied.

Third Embodiment

Figure 5:
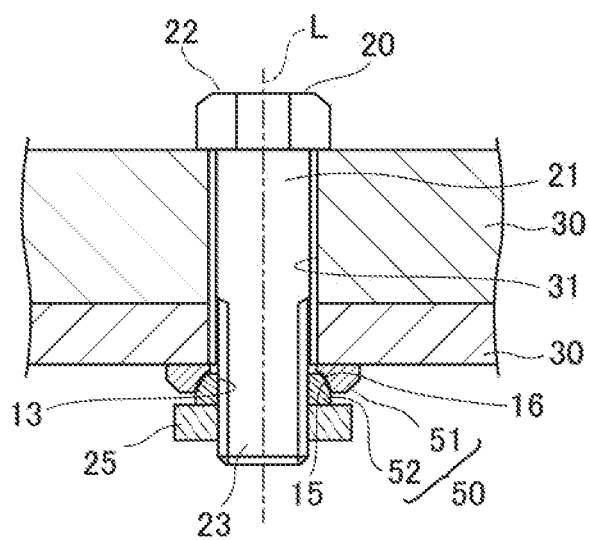
FIG. 5 is a cross-sectional view showing a state where members to be fastened are fastened by using a fastening device, which is washer device, according to a third embodiment of the present invention.
Figure 6:
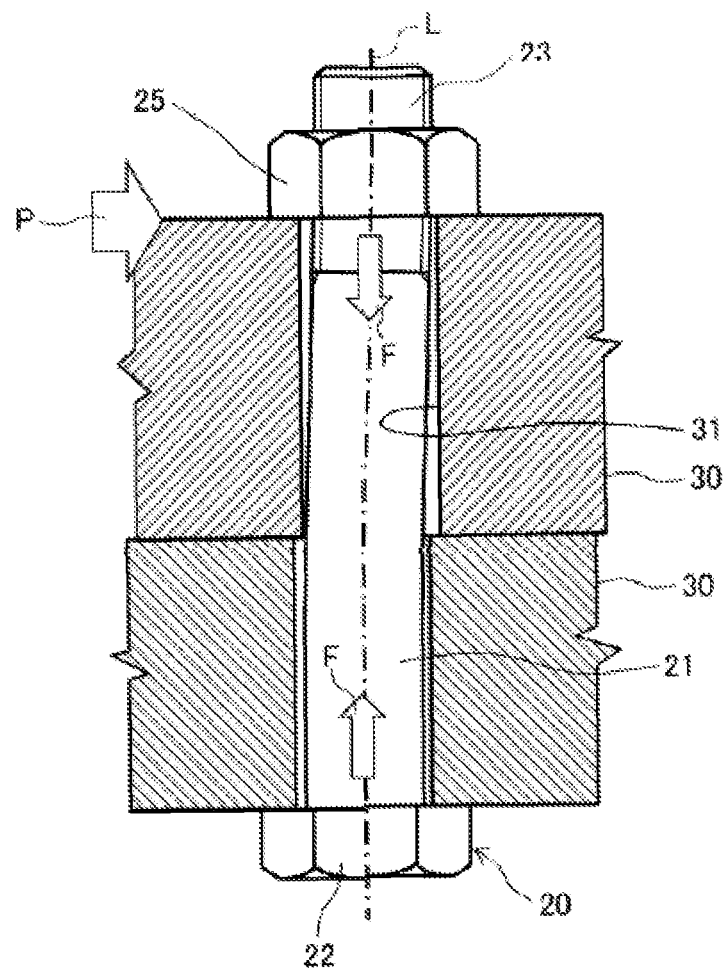
FIG. 6 is a cross-sectional view showing a state where members to be fastened are fastened by using a conventional fastening device.
Figure 7:
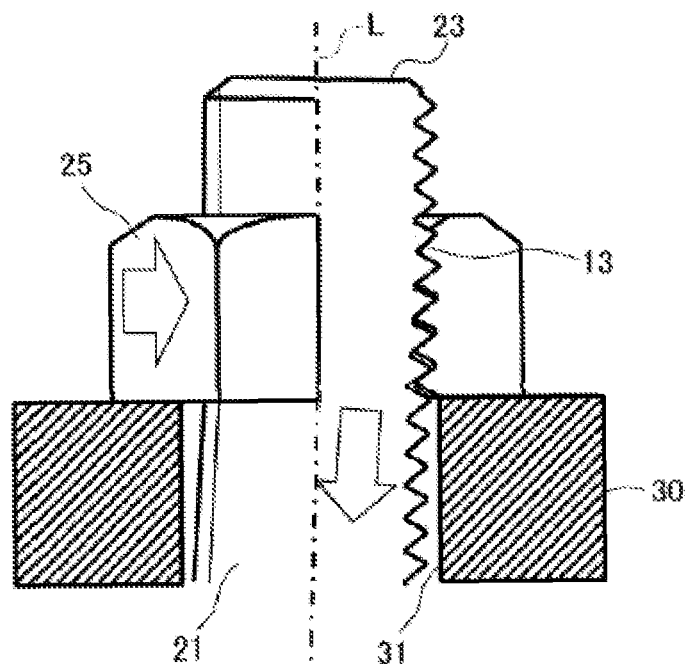
FIG. 7 is a magnified cross-sectional view of the conventional fastening device.

FIG. 5 is a cross-sectional view showing a state where members to be fastened are fastened by using a washer device according to a third embodiment of the present invention. In the third embodiment, as shown in FIG. 5, the washer device 50 is used together with a hexagon head bolt 20, which is externally threaded device, and a nut 25, which is internally threaded device, to fasten a plurality of members to be fastened 30, 30. In this case, the hexagon head bolt 20 is disposed, penetrating the plurality of members to be fastened 30, 30, and in a state where the seat of the head portion 22 abuts against the surface of one member to be fastened 30, the external thread portion 23 on the other end of the shaft portion 21 protrudes from the other member to be fastened 30 and is engaged with the nut 25. The washer device 50 is mounted between the nut 25 and the other member to be fastened 30.

The washer device 50 includes a first seat portion 51 and a second seat portion 52, which are ring-like. The first seat portion 51 has a convex portion 15. The second seat portion 52 has a concave portion 16. The convex portion 15 is slidably fitted in the concave portion 16. The convex portion 15 and the concave portion 16 have a spherical zone with a center on an axis line L of the externally threaded device 20.

In other words, at a position where the first seat portion 51 abuts against the second seat portion 52, the convex portion 15 and the concave portion 16, which are engaged with each other and capable of sliding, are provided. The convex portion 15 and the concave portion 18 are formed in a spherical zone similar to the first and the second embodiments. The radius of the spherical zone is shorter than the distance between the flank of the internal thread portion of the nut 25 and the axial line, the distance along the normal line of the flank, and the minimum angle of inclination of the tangent of the spherical zone is larger than the flank angle of the internal thread portion. The flank of the external thread portion is also applicable instead of the flank of the internal thread portion.

The concave portion 16 and the convex portion 15 have the similar shape as the first embodiment. In other words, the concave portion 16 and the convex portion 15 have a spherical shape centered at a point on the axial line L, and the convex portion 15 and the concave portion 16 are set to slide earlier than the engaged portion when a load is applied in a direction crossing the axial line L. As a result, when a plurality of members to be fastened 30, 30 are fastened by using the washer device 50 together with the hexagon head bolt 20 and the nut 25, similar function effect as the first and the second embodiments can be acquired, and thus loosening of the portion where the hexagon head bolt 20 is engaged with the nut 25 can be prevented easily.

In the above description, the washer device 50 is used together with the hexagon head bolt 20 and the nut 25. However, the third embodiment of the present invention is not limited to this, but the washer device 50 can also be used with other bolts, nuts, and even with other machine screws. The washer device 50 can also be used together with other washers and springs. The washer device 50 may also be supported between the head of the externally threaded device and the member to be fastened in a state where the shaft portion of the externally threaded device passes through the washer device. R may be defined as the slide turning radius of the screw surface. The spherical zone of the convex portion and the concave portion may be a device of the spherical surface centered at a point on the axial line, namely a band-like curved shape cut out by two faces orthogonal to the axial line.

In the third embodiment, a case where the first seat portion 51 has a convex portion 15 and where the second seat portion 52 has a concave portion 16 is described. However a case where the first seat portion 51 has a concave portion and where the second seat portion 52 has a convex portion is applied.

According to the embodiments of the present invention, the convex portion and the concave portion, which are engaged with each other and capable of sliding, are provided at the position where the main body of the internally threaded device abuts against, its seat, where the head portion of the externally threaded device abuts against its seat portion, or where the first seat portion of the washer device abuts against its second seat portion. The convex portion and the concave portion have the spherical zone centered at the point on the axial line, and the convex portion and the concave portion are set to slide earlier than the engaged portion when the load is applied in the direction crossing the axial line. Due to the sliding of the convex portion and the concave portion, the load exceeding the static frictional force is not applied to the portion where the external thread device is engaged with the internal thread device even if loads are applied repeatedly in the direction crossing the axial line during use, and relative turning of the engaged device can be prevented. Internally threaded device, externally threaded device, and washer device that do not allow engaged portion to get loose easily can thus be provided.

What is claimed is:

1. A fastening device, comprising:
a main body having a thread portion; and
a ring-shaped seat portion disposed between the main body and a member to be fastened, wherein
the main body has a convex portion and the ring-shaped seat portion has a concave portion, or the main body has a concave portion and the ring-shaped seat portion has a convex portion,
the convex portion is slidably fitted in the concave portion,
the convex portion and the concave portion have a spherical zone with a center on an axis line,
the spherical zone is set so that the convex portion and the concave portion slide before the main body rotates when a load is applied between the main body and the member in a direction crossing with the axis line,
the spherical zone has a radius shorter than a distance between the axis line and a flank of the thread portion and along a normal line of the flank, and
the spherical zone has a larger angle of inclination than a flank angle.

2. The fastening device according to claim 1, wherein the minimum angle of inclination formed by the normal line of the spherical zone and the axial line is 30° or larger, and the maximum angle of inclination falls within a range from 50° to 70°.

3. The fastening device according to claim 1, wherein the thread portion is an internal thread portion.

4. The fastening device according to claim 1, wherein
the main body has a shaft portion and a head portion,
the thread portion is an external thread portion provided at the head portion, and
the head portion has the convex portion or the concave portion.

5. A washer device, comprising:
a first ring-shaped seat portion and a second ring-shaped seat portion, held between a member to be fastened and an internally threaded device having the internal thread portion or a head portion of an externally threaded device when a shaft portion of the externally threaded device is penetrated into the member, wherein,
the first ring-shaped seat portion has a convex portion and the second ring-shaped seat portion has a concave portion, or the first ring-shaped seat portion has a concave portion and the second ring-shaped seat portion has a convex portion,
the convex portion is slidably fitted in the concave portion,
the convex portion and the concave portion have a spherical zone with a center on an axis line,
the spherical zone is set so that the convex portion and the concave portion slide before the internally threaded device rotates when a load is applied between the internally threaded device and the member in a direction crossing the axial line,
the spherical zone has a radius shorter than a distance between a flank of the internal thread portion and the axis and along a normal line of the flank, and
the spherical zone has a larger angle of inclination than a flank angle.

6. The washer device according to claim 5, wherein the minimum angle of inclination formed by the normal line of the spherical zone and the axial line is 30° or larger, and the maximum angle of inclination falls within a range from 50° to 70°.

* * * * *